United States Patent
Boutaghou

(10) Patent No.: US 6,535,464 B1
(45) Date of Patent: Mar. 18, 2003

(54) MAGNETO-OPTIC HEAD WITH BURNISHING FEATURE

(75) Inventor: Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/100,442

(22) Filed: Jun. 19, 1998

Related U.S. Application Data

(60) Provisional application No. 60/050,406, filed on Jun. 20, 1997.

(51) Int. Cl.$^7$ ............................. G11B 11/00; G11B 5/60
(52) U.S. Cl. .............................. 369/13.13; 360/236.6; 29/603.12; 73/105
(58) Field of Search ..................... 369/13, 102, 103, 369/114, 14, 13.13, 112.25, 300, 13.33, 13.17; 360/220, 114, 221.1, 230, 234.1, 234.3, 236.4, 236.6, 235.7, 235.6, 135; 451/173

(56) References Cited

U.S. PATENT DOCUMENTS

| | | | |
|---|---|---|---|
| 5,231,613 A | * 7/1993 | Nakayama et al. | 369/13 |
| 5,386,400 A | * 1/1995 | Nakayama et al. | 369/13 |
| 5,497,359 A | * 3/1996 | Mamin et al. | 369/44.15 |
| 5,817,931 A | * 10/1998 | Boutaghou | 73/105 |
| 5,831,797 A | * 11/1998 | Schaenzer et al. | 360/114 |
| 5,870,362 A | * 2/1999 | Boutaghou | 369/44.14 |
| 5,970,038 A | * 10/1999 | Boutaghou et al. | 369/112 |
| 6,112,401 A | * 9/2000 | Smith, Jr. | 29/603.12 |
| 6,212,042 B1 | * 4/2001 | Gui et al. | 360/236.6 |
| 6,219,332 B1 | * 4/2001 | Boutaghou | 369/300 |
| 6,230,380 B1 | * 5/2001 | Wang et al. | 29/90.01 |
| 6,307,832 B1 | * 10/2001 | Novotny et al. | 369/300 |
| 6,358,123 B1 | * 3/2002 | Liners et al. | 451/41 |
| 6,366,429 B1 | * 4/2002 | Stover et al. | 360/236.6 |
| 6,435,016 B1 | * 8/2002 | Smith et al. | 73/105 |
| 6,487,043 B1 | * 11/2002 | Murphy et al. | 360/135 |
| 6,490,134 B2 | * 12/2002 | Boutaghou | 360/235.7 |

* cited by examiner

Primary Examiner—Ali Neyzari
(74) Attorney, Agent, or Firm—Westman, Champlin & Kelly, P.A.

(57) ABSTRACT

A magneto-optical head assembly includes waffle-like burnishing features incorporated into the air bearing surfaces of the head assembly. The magneto-optical mesa, or operative feature of the magneto-optical head assembly, is configured such that the burnishing features are closer to the disc surface than the mesa. During operation, media asperities are contacted by the burnishing features rather than the mesa, and media debris generated by contact with the burnishing features is accumulated within the burnishing features, preventing degradation of read/write performance. Various methods for fabricating the magneto-optical head assembly and alternative configurations of the burnishing features are discussed.

18 Claims, 2 Drawing Sheets

MAGNETO-OPTIC HEAD WITH BURNISHING FEATURE

CROSS REFERENCE TO RELATED APPLICATIONS

This application claims the benefit of U.S. Provisional Application No. 60/050,406, filed Jun. 20, 1997.

FIELD OF THE INVENTION

This invention relates generally to the field of magneto-optic disc drive data storage devices, and more particularly, but not by way of limitation, to an improved head assembly for a magneto-optical disc drive data storage device which includes features for preventing media asperities from degrading the performance of the read/write function.

BACKGROUND OF THE INVENTION

Magneto-optical disc drive data storage devices, or magneto-optical drives, are well known in the industry. Such devices utilize a combination of electromagnetic and optical light technologies to store and retrieve data on the surface of appropriately designed plastic discs.

Evolutionary advances in the disc media and read/write heads have lead to the present generation of magneto-optical disc drives which are capable of large amounts of data on one side of a single disc. In order to achieve such data capacities, the magneto-optical transducers used to record and retrieve data are incorporated in self-acting hydrodynamic head assemblies that fly above the discs on a thin layer of air dragged along by the spinning disc. Head assemblies of the current generation typically fly at heights above the disc that bring the operative component of the magneto-optical transducer to within approximately 4 microinches (0.000004 inch) of the media surface.

Current manufacturing technology for the disc media produce discs that include both undulations on the size order of the head assembly and defects (tall single asperities). While the head assembly is capable of controlled flight over media undulations, a media asperity, while generally small enough to not affect the flying characteristics of the head assembly, can cause degradation of the magneto-optical head/disc interface, resulting in corruption of data storage and retrieval operations or, at worst, fatal failure of the disc drive.

Media asperities cause head/disc interface degradation because, when a media asperity passes under the magneto-optical transducer, small pieces of the media surface are broken off and can accumulate on the operative portion of the transducer. If enough of this media debris accumulates on the transducer, the optical performance of the transducer is negatively impacted.

While media manufacturing technology continues to advance, providing media with improved surface characteristics, a need still exists for apparatus that will prevent media asperities from degrading the performance of the magneto-optical head.

SUMMARY OF THE INVENTION

The present invention is a magneto-optical head assembly that includes waffle-like burnishing features incorporated into the air bearing surfaces of the head assembly. The magneto-optical mesa, or operative feature of the magneto-optical head assembly is configured such that the burnishing features are closer to the disc surface than the mesa. During operation, media asperities are contacted by the burnishing features rather than the mesa, and media debris generated by contact with the burnishing features is accumulated within the burnishing features, preventing degradation of read/write performance. Various methods for fabricating the magneto-optical head assembly and alternative configurations of the burnishing features are discussed.

It is an object of the invention to provide a magneto-optical head assembly for use with magneto-optical disc recording media.

It is another object of the invention to provide a magneto-optical head assembly that can operate on disc media with tall single asperities without suffering degradation of magneto-optical performance.

It is another object of the invention to provide a magneto-optical head assembly that includes features for burnishing asperities on the disc surface and accumulating any generated debris in the burnishing features.

It is another object of the invention to provide a magneto-optical head assembly which can be manufactured in a simple and economical manner.

The manner in which the present invention achieves these objects, as well as other features and benefits of the invention, can best be understood by a review of the following Detailed Description of the Invention, when read in conjunction with and examination of the accompanying drawings.

DETAILED DESCRIPTION OF THE INVENTION

Figure 1:
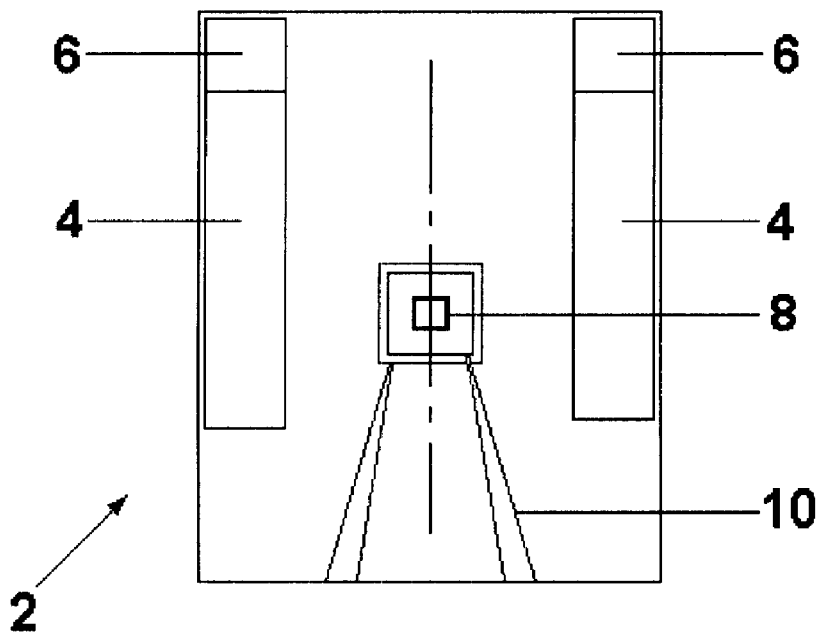
FIG. 1 is a simplified bottom plan view of a typical prior art magneto-optical head assembly.

Turning now to the drawings, and specifically to FIG. 1, shown in simplified bottom plan view is a typical prior art magneto-optical head assembly 2. The entire head assembly 2 is fabricated from a single piece of optically transparent material, such as zirconium, and the various features of the head assembly 2 are formed using the well known processes of ion milling, etching and material deposition.

The head assembly 2 includes a pair of laterally disposed side rails 4 which act in cooperation with a thin layer of air dragged along by a rotating disc to fly the head assembly 2 above the disc at a designed flying height on an air bearing. The side rails 4 are also referred to as the air bearing surfaces (ABS) of the head assembly 2.

In order to facilitate the flying of the head assembly 2, the side rails 4 can include beveled portions 6 at their leading edges.

The operative component of the magneto-optical transducer carried by the head assembly is often referred to as a mesa 8, since it is typically raised above surrounding portions of the head assembly, and control of the magneto-optical function of the head is achieved through the inclusion of an array of conductive traces 10 deposited on the head using well know material deposition techniques.

Figure 2:
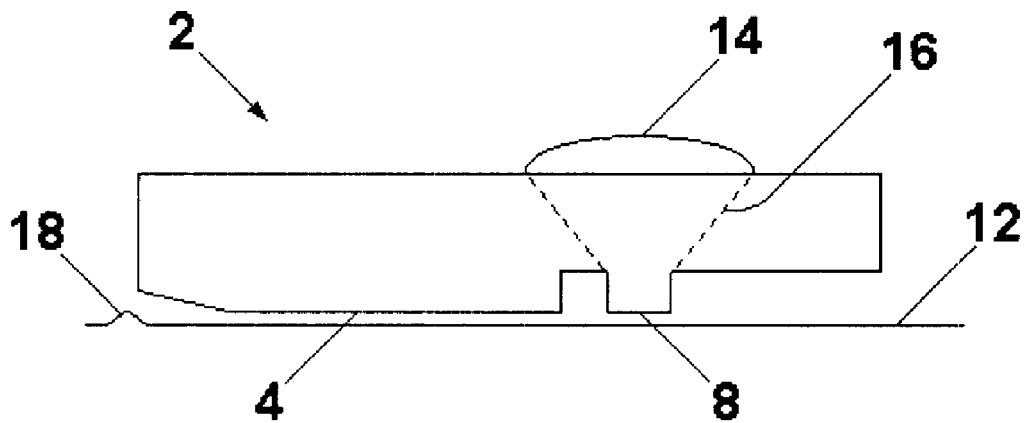
FIG. 2 is a simplified side elevation view of the prior art magneto-optical head assembly of FIG. 1.

FIG. 2 is a simplified side elevation view of the prior art head assembly 2 of FIG. 1, and shows the head assembly in its operative relationship with a disc surface 12. As can be seen in the figure, the ABS 4 of the head assembly and the lowermost surface of the mesa 8 are typically arranged to lie at similar distances from the disc surface 12 when the head assembly 2 is in its intended operational relationship to the disc.

The head assembly 2 can also be seen to include a lens 14 formed on its upper surface. The lens 14 serves to focus light from a light source (not shown) as represented by dashed lines 16 to concentrate the light at the mesa 8, all in a manner well known in the art.

A principal disadvantage of this type of prior art head assembly 2 lies in its operation when confronted with tall single asperities in the disc surface 12, such as the asperity designated by numerical reference 18. As will be appreciated by one of skill in the art, the asperity 18 is too small to significantly affect the overall flying characteristics of the head assembly 2. However, as shown in the figure, such asperities can be large enough to directly contact the ABS 4 or mesa 8 of the head assembly 2. Such contact typically acts to dislodge a portion of the asperity 18 causing a piece or pieces of loose debris on the disc surface 12. As the head assembly 2 is moved across the disc surface 12 from data track to data track, there is an extreme likelihood that such debris will adhere to the mesa 8, and if enough of such debris accumulates on the mesa 8, the optical performance of the magneto-optical transducer will be degraded, potentially to a point where the disc drive will be rendered non-operational.

Figure 3:
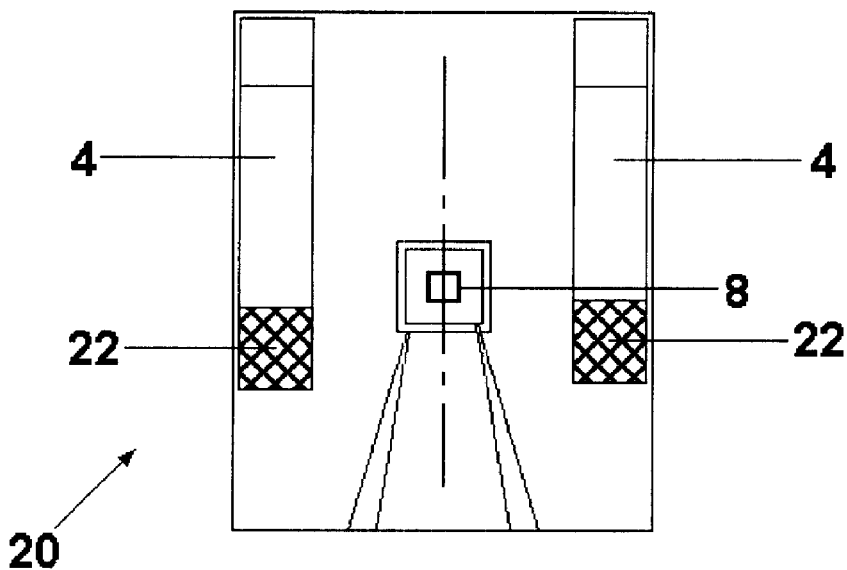
FIG. 3 is a simplified bottom plan view of a magneto-optical head assembly manufactured in accordance with the present invention.

Turning now to FIG. 3, shown is a simplified bottom plan view of a magneto-optical head assembly 20 manufactured in accordance with the present invention. The head assembly 20 includes a laterally disposed pair of side rails, or ABS, 4 and a mesa 8 as did the prior art head assembly 2 of FIGS. 1 and 2.

The first difference between the inventive head assembly 20 and the prior art head assembly 2 is the presence of a pair of waffle-like burnishing features 22 disposed on the trailing end of the ABS 4. It is envisioned that the burnishing features 22 consist of an intersecting network of sharply defined grooves or trenches lying at an angle to the longitudinal and lateral axes of the head assembly 20. While the figure shows the individual trenches of the burnishing features 22 lying at substantially 45° angles from the principal axes of the head assembly 20, the scope of the present invention is envisioned to encompass burnishing features with other angular relationships to the overall head assembly. Therefore, the specific orientation of the elements of the burnishing features 22 relative to the overall head assembly 20 should not be considered as limiting to the scope of the invention. Furthermore, it is envisioned that the scope of the present invention is not limited by the specific location of the burnishing features on the air bearing surface. That is, the burnishing feature can be located at the trailing edge of the ABS, as shown, or at the leading edge, or at any intermediate location, and can extend across less than the entire width of the ABS without exceeding the envisioned scope of the invention.

It is also contemplated by the invention that the burnishing features 22 can be fabricated using any of a number of manufacturing techniques. For instance, the burnishing features 22 can be formed by first creating the ABS 4 of the head assembly 20, and then depositing additional material, such as a diamond-like carbon (DLC), on the trailing edges of the ABS 4 using well known masking and material deposition methods. Alternatively, the ABS 4 can be formed and then the elements of the burnishing features 22 can be cut into the trailing end of the ABS 4 by etching or sawing. Other methods of fabrication of the burnishing features 22 may be suggested to those of skill in the art after a review of this disclosure. Therefore, the scope of the present invention is not considered to be limited by the specific methods or techniques used to achieve the functional characteristics of the burnishing features 22.

While the specific dimensions defining the elements of the burnishing features 22 of the head assembly 20 will be dictated by the specific combination of data transducer and disc media employed in the disc drive, it is presently envisioned that the individual grooves or trenches in the burnishing features 22 will be on the order of 0.1 to 0.3 microns deep, and spaced approximately 25 microns apart. However, the specific dimensions cited are for reference only and not considered to be limiting to the scope of the invention.

The general method used to create the burnishing features 22 can, however, effect the implementation of a second major characteristic of the present invention, which is not readily apparent from FIG. 3. This second major characteristic of the present invention is that the head assembly 20 be fabricated such that the mesa 8 is not the element of the overall head assembly 20 closest to the disc surface. The way in which this second major characteristic of the invention is implemented and how this implementation is impacted by the method used to form the burnishing features 22 can best be seen in FIGS. 4 and 5.

Figure 4:
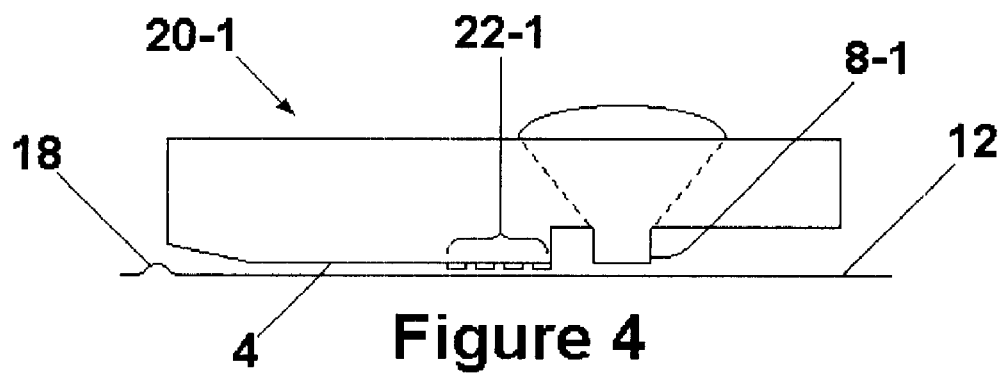
FIG. 4 is a simplified side elevation view of one embodiment of the inventive magneto-optical head assembly of FIG. 3.

FIG. 4 is a simplified side elevation view of a head assembly 20-1 implemented in accordance with a first embodiment of the invention. Specifically, FIG. 4 represents those embodiments of the invention in which the methodology used to create the burnishing features 22-1 add material to the surface of the ABS 4.

As can be seen in FIG. 4, when the burnishing features 22-1 are formed by adding material to the ABS 4, the burnishing features 22-1 are the elements of the head assembly 20-1 closest to the disc surface 12, while the ABS 4 and mesa 8-1 are shown to be substantially coplanar and in a spatial relationship to the disc surface 12 similar to that shown in the prior art of FIG. 2. Thus any media asperity 18 which is contacted by the burnishing features 22-1 will be lowered to a height less than the spacing between the mesa 8-1 and the disc surface 12, lessening the chance that the mesa 8-1 will ever come into contact with a media asperity 18. Secondly, the waffle-like nature of the burnishing features 22-1 increase the probability that any debris created by the burnishing action will be accumulated within the grooves of the burnishing features 22-1, and thus will not accumulate on the mesa 8-1 and degrade the functionality of the head assembly 20-1.

Figure 5:
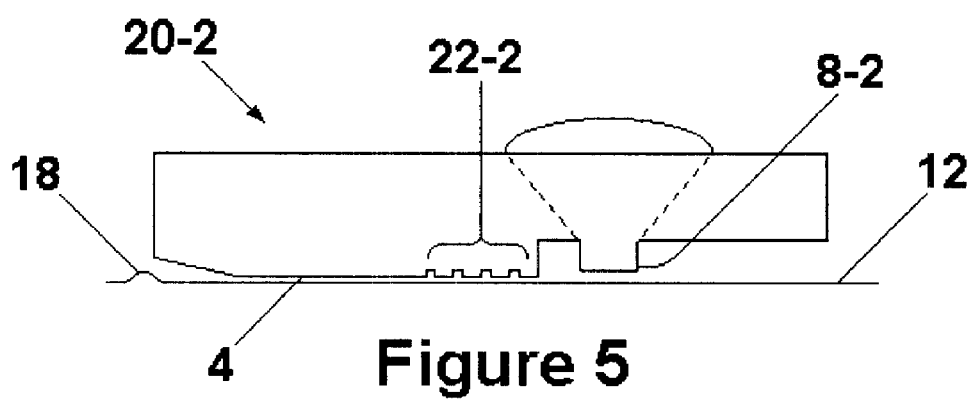
FIG. 5 is a simplified side elevation view of a second embodiment of the inventive magneto-optical head assembly of FIG. 3.

FIG. 5 is representative of a head assembly 20-2 in which the burnishing features 22-2 are cut into the ABS 4. As previously mentioned, such burnishing features 22-2 can be achieved by etching, sawing or other known techniques, and the specific technique employed to create the burnishing features 22-2 is not considered to be limiting to the scope of the invention.

In order for the head assembly 20-2 to provide the same functionality as described for the embodiment of FIG. 4, the burnishing features 22-2 must be closer to the disc surface 12 than the lower surface of the mesa 8-2. To accomplish this, the mesa 8-2 is shown to be non-coplanar with the ABS 4. That is, the lower surface of the mesa 8-2 is further from the disc surface 12 than the ABS 4, and thus further from the disc surface 12 than the burnishing features 22-2. In order to maintain the proper operative relationship between the mesa 8-2 and the disc surface 12, this embodiment of the present invention envisions that the ABS 4 of the head assembly 20-2 be modified to fly the head assembly 20-2 in closer overall proximity to the disc surface 12. A comparison of FIGS. 4 and 5 reveals that while the ABS 4 in FIG. 5 is shown in closer proximity to the disc surface 12 than that of FIG. 4, the spatial relationship of the mesa 8-1, 8-2 to the disc surface 12 in both figures remains the same, thus maintaining both the surface burnishing function of the present invention and the operative relationship between the data transducer and the disc.

From the foregoing, it is apparent that the present invention is particularly well suited and well adapted to achieve the objects set forth hereinabove, as well as possessing other advantages inherent therein. While a particular combination of components and materials have been disclosed with regard to the presently preferred embodiments, certain variations and modifications may be suggested to one of skill in the art upon reading this disclosure. Therefore, the scope of the present invention should be considered to be limited only by the following claims.

What is claimed is:

1. A magneto-optical head assembly for recording and retrieving data on a surface of a magneto-optical disc comprising:
    a longitudinal axis and a lateral axis;
    a magneto-optical transducer, the transducer including a mesa with a lowermost surface maintained at a first distance from the surface of the disc;
    a pair of laterally disposed side rails forming air bearing surfaces for flying the head assembly above the disc surface; and
    burnishing features located on the air bearing surfaces and having edges that are non-parallel relative to the longitudinal and lateral axes, the burnishing features disposed to lie at a second distance from the disc surface, the second distance being less than the first distance.

2. A magneto-optical head assembly as claimed in claim 1 wherein the burnishing features are formed by adding material to the air bearing surface and wherein the air bearing surfaces are substantially coplanar with the lowermost surface of the mesa.

3. A magneto-optical head assembly as claimed in claim 1 wherein the burnishing features are cut into the air bearing surfaces.

4. A magneto-optical head assembly as claimed in claim 1, wherein the plurality of edges are formed by a network of intersecting grooves.

5. A magneto-optical head assembly as claimed in claim 1 wherein the edges lie at angles of approximately 45 degrees relative to one of the longitudinal and lateral axes of the head assembly.

6. A magneto-optical head assembly as claimed in claim 1 wherein the edges lie at angles that are between 0 and 90 degrees relative to one of the longitudinal and lateral axes of the head assembly.

7. A magneto-optical head assembly as claimed in claim 1 wherein the burnishing features are confined to a trailing end of the air bearing surfaces.

8. A magneto-optical head assembly as claimed in claim 1 wherein the burnishing features are confined to a leading end of the air bearing surfaces.

9. A magneto-optical head assembly as claimed in claim 1 wherein the burnishing features are intermediately disposed between a leading end and a trailing end of the air bearing surfaces.

10. A magneto-optical head assembly as claimed in claim 1 wherein the burnishing features extend to less than the entire lateral extent of the air bearing surfaces.

11. A magneto-optical head assembly as claimed in claim 3 wherein the material added to the air bearing surface is a diamond-like carbon material.

12. A magneto-optical head assembly as claimed in claim 4 wherein the individual grooves comprising the network of intersecting grooves have a depth that falls within an approximate range of 0.1 to 0.3 microns.

13. A magneto-optical head assembly as claimed in claim 4 wherein individual grooves comprising the network of intersecting grooves are spaced approximately 25 microns apart.

14. A magneto-optical head assembly for recording and retrieving data on a surface of a magneto-optical disc comprising:
    a magneto-optical head having a surface that includes a longitudinal axis, a lateral axis and an air bearing surface for flying the head assembly above a disc surface; and
    burnishing features in the form of a network of intersecting grooves located on the air bearing surface, wherein individual grooves of the network of intersecting grooves lie at angles to the longitudinal and lateral axes of the head assembly.

15. A magneto-optical head assembly as claimed in claim 14 wherein individual grooves comprising the network of intersecting grooves lie at angles that are between 0 and 45 degrees relative to one of the longitudinal and lateral axes of the head assembly.

16. A magneto-optical head assembly as claimed in claim 14 wherein individual grooves comprising the network of intersecting grooves lie at angles of approximately 45 degrees relative to one of the longitudinal and lateral axes of the head assembly.

17. A magneto-optical head assembly as claimed in claim 14 wherein the burnishing features are formed by adding material to the air bearing surface and wherein the air bearing surface is substantially coplanar with the lowermost surface of the mesa.

18. A magneto-optical head assembly as claimed in claim 14 wherein the burnishing features are cut into the air bearing surface.

* * * * *